Patented Jan. 7, 1930

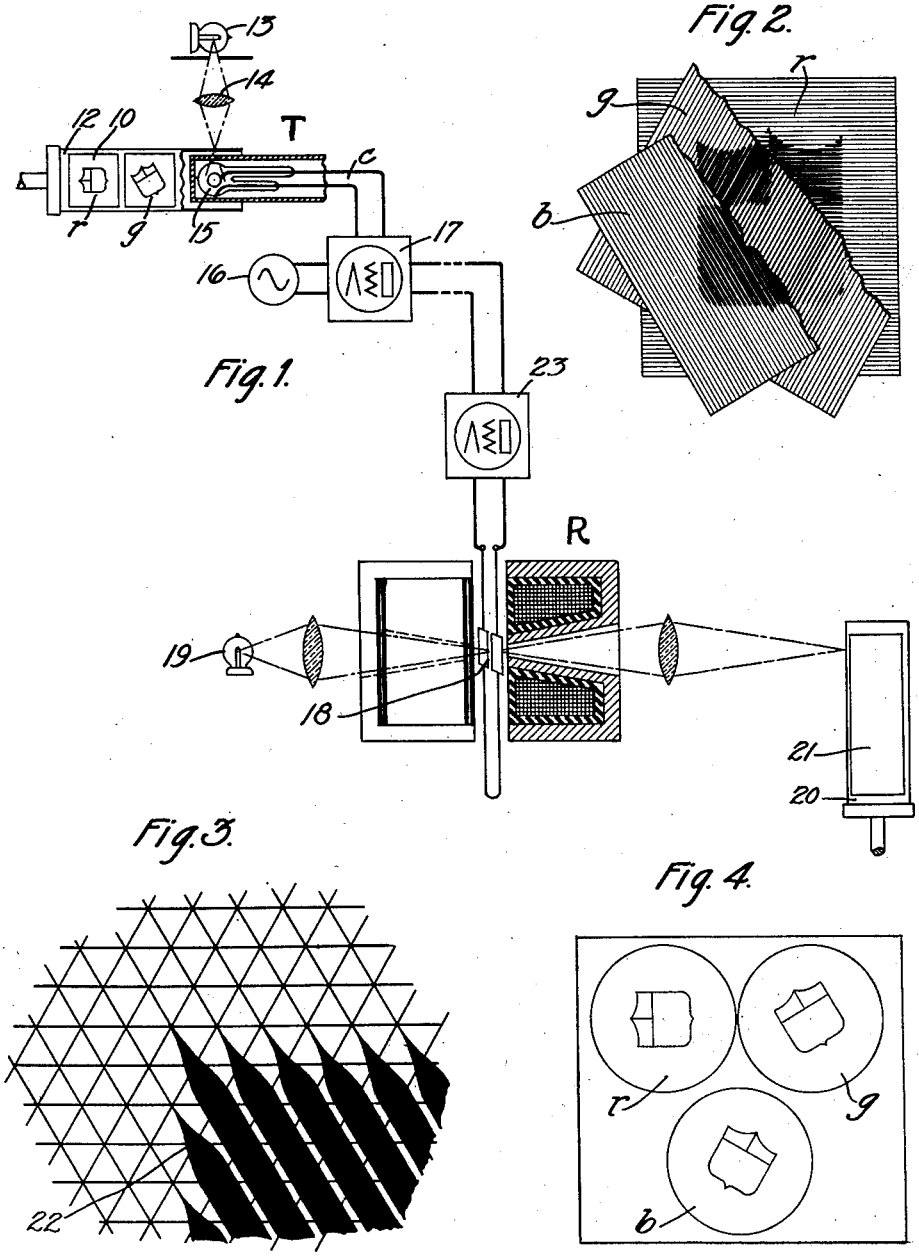

1,742,543

UNITED STATES PATENT OFFICE

HERBERT E. IVES, OF MONTCLAIR, NEW JERSEY, ASSIGNOR TO WESTERN ELECTRIC COMPANY, INCORPORATED, OF NEW YORK, N. Y., A CORPORATION OF NEW YORK

COLORED-PICTURE TRANSMISSION

Application filed November 26, 1924. Serial No. 752,324.

This invention relates to the production of colored pictures and more particularly to the transmission of colored pictures electrically. Various electrical methods have been employed for transmitting photographs electrically and various means have been used in sending and reproducing photographs transmitted by electrical methods.

One method of producing photographs which has been found satisfactory employs a rotating cylinder carrying a transparency of the picture. By means of a beam of light traversing the transparency and falling upon a light sensitive element, electrical variations are impressed upon a carrier wave to be transmitted to a distant station. After amplification at the receiving station, these variations operate a light valve to permit more or less light to fall upon a light sensitive film which is mounted on a drum rotating in synchronism with the drum carrying the transparency at the sending station.

As the beam of light at the sending station passes over each elemental area of the transparency, a beam of light passing through the light valve is varied in width and falls upon the light sensitive film at the receiving station. In this manner, the whole area of the transparency is passed over and a reproduction of the original is formed at the receiving station consisting of lines of varying width corresponding to the light and dark portions of the transparency. A more complete description of this method of producing photographs is given in the patent of Horton et al No. 1,606,227, issued Nov. 9, 1926. Other forms of apparatus which may be employed produce dots of varying size or in different arrangements corresponding to the shaded portions of the picture. Still other types of apparatus produce facsimiles of the picture being transmitted.

In the form of the invention illustrated in the accompanying drawings, the picture is transmitted in the form of lines of varying widths.

One of the objects of this invention is the production of colored pictures by a new and improved method especially adapted to the transmission and reproduction of colored pictures electrically.

Another object of the invention is to produce colored pictures by means of color records transmitted from one station to another.

Another object of the invention is to produce in a novel manner records which may be used in producing colored pictures.

Another object is to electrically transmit separate color records of the same subject in such manner that the reproduced records are suitable for being superimposed or projected upon one another to produce a colored image of the original subject.

Other objects and advantages of the invention will become apparent from the following specification.

In carrying out the principal objects of this invention separate black and white records of the usual kind corresponding to various aspects of the picture or subject are produced and transmitted to a distant point in such manner that line records are produced, the lines of which are at different desired angles in the different records so that when these records are superimposed or projected upon each other an image in color of the original picture or subject is produced without the formation of "patterns". A reference axis of the record or picture is useful in describing the arrangement and as used herein it is considered as any straight line across the picture which divides it symmetrically. As above stated the directions of scanning the different records corresponding to the different color aspects of the picture or subject are made at different angles with any given axis. Alignment of the corresponding axes of several superimposed reproduced records causes them to be positioned so that the scanning lines take up the different desired directions.

When transparent color records are superimposed or projected upon one another the lines or dots forming the picture overlap producing points of color. If these points are not equally spaced or the lines cross at small angles they will intersect over a considerable length of the line and cause uneven distribution of the color points. Such an arrangement of the color points produces "patterns" or streaks throughout the picture resulting in such uneven color effects that the value of the picture is destroyed.

In the accompanying drawings illustrating one form of the invention Fig. 1 is a schematic illustration of the transmitting and receiving stations showing the sending and reproducing drums for transmitting and reproducing the picture. Fig. 2 illustrates three color-records superimposed at angles to each other to reproduce the colored picture. Fig. 3 is an enlarged section of Fig. 2 illustrating the lines at angles of 60° to each other and meeting in equidistant points. Fig. 4 illustrates a modification of the transmitting film, having a plurality of color-records at an angle to each other on one film for simultaneous transmission and reproduction.

In the production of colored pictures, it is customary to form three primary color-records or pictures, each of which records in its light and shade, the amount of one primary color necessary to be mixed with proper amounts of the other two primaries to reproduce the colors of the original object. A separate color-record is formed for each primary color, for example, red, green and blue, and these when combined produce a picture having all the colors and shades of the original.

As illustrated in the drawings, a color-record 10 corresponding for example to the red primary is fastened on the sending drum 12 in the transmitting station T. Light from the source 13 traversing lens 14 focuses on the color record 10 and falls on the photo-electric or other light sensitive cell 15. The sending drum 12 rotates about its center as an axis and is moved longitudinally by means of a thread having a very small pitch so that the whole surface of the color record is passed over in a series of lines, about 50 to the inch being usual. In this manner, each elemental area is in turn scanned by the light focused on the surface. The variations in the amount of red in each section of the picture which corresponds to the amount of black and white in the color-record, causes a corresponding variation in the amount of light falling on the light sensitive cell 15. This causes corresponding variations in the current flowing in the circuit C which variations, in turn, are impressed upon the carrier current produced by oscillator 16 and amplifier 17. At the receiving station R these variations are amplified by an electron discharge device 23 to cause variations in the size of aperture 18 corresponding to the variations of the current in circuit C. This permits a greater or less amount of light from the source 19 to fall upon the light sensitive film 20 mounted on a receiving drum 21 which is rotating in synchronism with the sending drum 12 at the transmitting station. In this manner the entire film at the receiving station is scanned and a black and white or monochrome line reproduction of the color-record being transmitted is formed. In a similar manner, green and blue color-records are formed as black and white line reproductions with lines spaced one-fiftieth inch apart. These color records are reproduced as positives which may be projected upon a screen through appropriate colored glasses or may be dyed or colored their respective colors in any suitable manner and superimposed with corresponding portions of each reproduction placed upon one another to produce the same color effect in each elemental area of the picture as was present in the original. They may also be employed in producing typographic printing plates for printing colored pictures if desired.

Fig. 2 shows three of these color records $r$, $g$ and $b$, corresponding to red, green and blue, respectively, positioned with the lines at 60° and the figures superimposed to produce the pictures in the colors of the original. These reproductions are transparent, although shown broken away for the purpose of better illustrating the lines. The varying width of the line produces the picture as shown in Fig. 3. The lines of the respective reproductions then cross each other at angles of 60°, as shown in Fig. 3, forming points or areas of color very close together and uniformly spaced, predominated by the color most prominent in the picture at that point, as illustrated at the points 22 in Fig. 3. These points or dots being only one-fiftieth inch apart and of the color corresponding to the original produce in effect a colored picture having all the characteristics of the original. The angle of 60° is chosen for three-color records as this produces the most uniform spacing of the color points and the least tendency to streak or form patterns but it is obvious that the lines may be formed at other angles or even parallel, and dot records may be employed instead of line records. It is understood that the term line record as used is intended to include dot records as the line could be converted to dots by interrupting the source of light. It is also evident that any number of color-records may be employed for the various colors of the picture, but the primary colors may seem most suitably adapted for this purpose. The term "color-record" as used is intended to include both negatives and positives or any other means employed to record the mixing proportions of the primary colors used.

In accordance with this invention the color records at the transmitting station are mounted on the sending cylinder with their corresponding axes at angles to each other. The records are then scanned as in ordinary photograph transmission so that the three color records at the receiving station are reproduced as line records composed of parallel straight lines. Thus when the reproduced records are superimposed the lines of the separate records will be at angles to each other when the corresponding portions of the picture are placed upon one another.

In the red color-record, for instance, an axis of the picture may be at 90° to the line in which the picture is being scanned and reproduced and in the green color-record the corresponding axis of the picture may be at 30° to the left of the line in which the picture is scanned, while in the blue the axis would be at 30° to the right of the line in which it is scanned. Thus when the records are combined to form the picture the lines of the separate records will lie at angles of 60° to each other. The angles of the various color-records may be varied at will to suit various circumstances. The color-records may be all mounted in the same cylinder as illustrated at $r$ and $g$ of Fig. 1 for transmission in succession as one operation or they may be sent as separate transmissions.

In the modification illustrated in Fig. 4 the three color records are taken or formed on one film in any position or direction desired, but preferably at an angle of 60°, as shown. While the records are illustrated as circular their shape may be varied at will. This form of film facilitates sending of the records, as the whole set will be transmitted simultaneously in one operation with one adjustment of the transmitting apparatus, thus minimizing the risk of the three records not corresponding properly in photographic density with each other, as might happen with any alteration of the instrumental adjustments. These color records when received are separated and positives are framed, colored and superimposed or combined to produce the original picture, as in the case of color records transmitted separately. The records may be received on separate films or in facsimile form if desired.

From the foregoing description and drawings it is seen that an effective method has been developed for transmitting and reproducing colored pictures by electrical means. It is not, however, intended to limit the invention to the specific form or mechanism disclosed.

What is claimed is:

1. The process of electrically transmitting colored pictures, which comprises preparing a set of transparent monochrome color records, scanning said records with a light source, transmitting as a single operation said color records electrically to a distant point, reproducing said records as line images of the original, and utilizing said line images to produce the original picture in colors.

2. The process of electrically transmitting colored pictures, which comprises preparing a set of color records, transmitting as a continous operation said records electrically to a distant point, reproducing said color records as transparent reproductions, and combining said reproductions to produce the original picture in colors.

3. The process of electrically transmitting colored pictures, which comprises preparing a set of color records, transmitting electrically and uninterruptedly said records to a distant point, reproducing said color records as line images of the original records, and superimposing colored reproductions of said line images with the lines at angles to each other to produce the original picture in colors.

4. The process of electrically transmitting colored pictures, which comprises preparing a plurality of separate color records on a single element, transmitting said records continuously to a receiving station, and utilizing said records to reproduce the original picture in colors.

5. The process of electrically transmitting colored pictures, which comprises preparing a plurality of separate transparent color records on a single element, transmitting said records to a distant point, reproducing said records as monochrome line images of the original, and utilizing said line images to reproduce the original picture in colors.

6. The process of electrically transmitting colored pictures, which comprises electrically transmitting as a continuous operation a plurality of color records with their corresponding axes at angles to each other and combining reproductions of said records with said axes superimposed.

7. The process of electrically transmitting colored pictures, which comprises preparing a set of color records, scanning in a continuous operation the elemental areas of each record in lines at a different angle to a given axis of the picture from that of each other record, transmitting all said records in one operation by means of electrical variations and utilizing said variations to reproduce the color records to be used in producing the picture in colors.

8. The process of electrically transmitting colored pictures, which comprises preparing a set of primary color records, scanning each color record in lines making angles of 60° with a given axis of each color record, transmitting said records without interruption to a distant point by means of electrical variations corresponding to the varying amount of transparency of each element of the separate lines, reproducing the color records as line records having their lines at an angle of 60° with each other, and utilizing said records to reproduce the original picture in colors.

9. The process of electrically transmitting colored pictures, which comprises preparing a plurality of separate color records on a single element, a given axis of each record being at an angle to the corresponding axis of each other record, scanning all said records in parallel lines, electrically transmitting said records to a distant point, and utilizing said records to reproduce the original picture in colors.

In witness whereof, I hereunto subscribe my name this 25th day of November, A. D. 1924.

HERBERT E. IVES.